United States Patent Office 3,278,506
Patented Oct. 11, 1966

3,278,506
WATER-SOLUBLE POLYMERS AND COPOLYMERS
Walter M. Chamot, Brookfield, and Burton H. Robin, Chicago, Ill., assignors to Nalco Chemical Company, Chicago, Ill., a corporation of Delaware
No Drawing. Filed Aug. 21, 1961, Ser. No. 132,562
16 Claims. (Cl. 260—89.7)

The present invention relates to water-soluble polymers and copolymers of ethylenically unsaturated monomers such as acrylamide and to an improved process for preparing such materials. Another aspect of the invention is directed to the use of the acrylamide polymers and copolymers as coagulants in particular systems.

Inasmuch as monomers such as acrylamide, methacrylamide, acrylic acid, methacrylic acid, etc., are water-soluble, almost all of the known methods of polymerizing these substances are begun by forming an aqueous solution of the monomer. A catalyst such as potassium persulfate, hydrogen peroxide, or benzoyl peroxide is added to the solution and sufficient heat is applied to effect polymerization. Because the reaction is exothermic, it is essential that the process be carried out on dilute solutions of the monomer. In polymerizing acrylamide, if the monomer concentration is greater than about 30%, for example, the polymer formation is violent, and a non-flowable, rubbery mass is produced, which is almost impossible to handle in subsequent operations.

Polyacrylamide and copolymers consisting primarily of polyacrylamide have been used as coagulants in various systems. It has been found that polyacrylamides prepared from dilute solutions by prior art methods are inferior in coagulating ability to polymers prepared from more concentrated solutions by the process of this application. It has also been found that the polymers prepared by the subject process have a higher molecular weight and are superior in coagulating ability to polymers prepared by so-called emulsion or suspension polymerization methods.

It is an object of the present invention to provide an improved method of polymerizing water-soluble monomers.

A more specific object of the invention is to provide an improved process for polymerizing acrylamide.

Still another object of the invention is to provide a process in which polymers are formed from concentrated aqueous solutions of monomers.

Another object of the invention is to provide a process in which the polymerization of concentrated aqueous solutions of monomers is initiated by extremely small amounts of catalyst.

Another object is to provide new compositions of matter which possess unexpected and advantageous properties.

A still further object of the invention is to provide a process for copolymerizing acrylamide and acrylic acid.

Another object of the invention is to provide an improved method of copolymerizing acrylamide and dialkyl amino ethyl methacrylates.

Another object of the invention is to provide a process for polymerizing acrylamide which produces solid particles of the polymer without additional processing.

Still another object of the invention is to provide an improved process and agent for coagulating certain materials.

Other objects of the invention will become apparent to those skilled in the art from the following detailed description.

In general, the present invention comprises the discovery that highly advantageous polymers can be produced by the polymerization of an aqueous solution containing a high concentration of monomers. More specifically, it has been found that improved polymers are produced by mixing a concentrated aqueous solution of an ethylenically unsaturated monomer such as acrylamide and a polymerization catalyst with an organic, water-insoluble heat transfer medium such as benzene, toluene or xylene, and thereafter allowing the monomer to polymerize in a separate stratum within this system in the presence of a surface active compound which acts as an antisticking agent.

In our process an aqueous solution is prepared containing from about 30% to about 80% by weight acrylamide, 20% to 70% water, 0% to 50% urea, and .003% to about 0.2% based on the weight of acrylamide of a polymerization catalyst, such as potassium persulfate. The water solution is then added to or mixed with a water-insoluble, organic heat transfer medium which preferably is capable of forming an azeotropic mixture with water. The mixture should contain a minor amount of a surface active agent which prevents the polymer from sticking to the agitator and the walls of the vessel. The temperature of the system is raised to a desired point and the mixture is kept in motion by means of an agitator. Oxygen is removed from the system either by purging with an inert gas such as nitrogen or carbon dioxide, by applying a vacuum or by boiling the mixture. The polymerization is initiated as soon as the oxygen is removed. If an emulsion has formed due to the presence of the surface active agent, the emulsion breaks and the polymerization is carried out in a separate water layer. The organic heat transfer medium substantially surrounds the aqueous medium as the polymerization takes place. Vigorous agitation is employed to shear the polymer into particles which vary in diameter, for example, from about $\frac{1}{16}$ inch to about 2 inches and more often from about $\frac{1}{4}$ to $\frac{1}{2}$ inch. In our preferred process the temperature of the mixture is raised to its boiling point (or maintained at the boiling point in the event that the polymerization was carried out at the boiling point of the mixture) after the polymerization is completed and water is removed by azeotropic distillation. The boiling temperature, of course, varies in accordance with the particular organic heat transfer agent in the mixture.

During the boiling off stage, the organic solvent preferably is condensed and returned to the mixture while the water is being trapped and removed. After from 60 to 100% of the water has been eliminated, the granules that have formed are separated from the solvent by filtration and are then washed and air dried.

It has been found the benzene, toluene, xylene, and ethylene dichloride are especially suitable for use in the present process along with carbon tetrachloride, tetrachloroethylene, and the like. Other comparable organic compounds that form azeotropic mixtures with water, however, can be used without difficulty so long as they do not contain alcohol, aldehyde or ketone groups, which would cause undesirable side reactions. The polymerization medium can also contain a nonazeotroping component of boiling point above the distilling temperature.

The catalysts that are employed in the process include conventional peroxidic oxidizing agents such as potassium persulfate, hydrogen peroxide, and ammonium persulfate. It is preferred that water-soluble compounds be used for this purpose. The amount of catalyst used in the process can vary from 0.003% to about 0.2% by weight, based on the weight of the monomer. Our preferred range is from about 0.003% to about 0.05%. Catalyst concentrations above 0.2% will polymerize the acrylamide solution but the resultant products are inferior to those prepared using amounts of catalyst within the specified range. One of the advantages of the subject process, therefore, is that it provides a means of carrying out the polymerization using very small amounts of catalyst.

As was pointed out above, a surface active agent should be added to the polymerization mixture in order to prevent the polymer from sticking to the walls of the reaction vessel and to the agitator. There are numerous compounds on the market which would perform satisfactorily in this capacity. Materials such as Ethomid S–15, O–15, and HT–15, which are ethylene oxide condensates of fatty acid amides, as well as Arlacel 80 and Span 80, which are sorbitan monooleates, will serve adequately as antisticking agents as will sorbitan monostearate, sodium dodecyl benzene sulfonate, aluminum stearates, and aluminum oleates. Initially in the process, the presence of the surface active agent may cause the formation of an emulsion. It is essential, however, that the emulsion break and form two separate and distinct layers prior to the polymerization reaction. The amount of surface active agent which is added to the system can vary from about .5% to about 7% by weight based on the weight of the heat transfer medium, and preferably will vary from about 2% to about 4% by weight. During the polymerization the monomer-containing aqueous medium is substantially surrounded by the organic heat transfer medium.

The following examples will serve to illustrate the subject invention.

EXAMPLE 1

This example shows a satisfactory method of preparing the subject polymers.

A solution (A) was prepared consisting of 100 ml. of tetrachloroethylene, 400 ml. of benzene, and 24 g. of Ethomid O–15 (a surface active agent) in a 1,000 ml. three-necked, round bottom flask, which was fitted with a half-moon stirrer, a thermometer, and a Barrett trap with condenser. This solution was held at 60° C. A second solution (B) was prepared by mixing 67.5 g. of acrylamide, 6 g. of urea, and 54 g. of distilled water in a stainless steel beaker. The mixture was heated to 50° C. to dissolve the solids, after which 1.2 ml. of 1% potassium persulfate was added with stirring. The resultant solution was held for four minutes at a temperature of 50–52° C. to activate the catalyst. In order to prevent premature polymerization from occurring, care was taken to insure that the solution was not held for more than five minutes at these temperatures.

Solution (B) was then added to solution (A) with mild agitation. Initially, an emulsion was formed of solutions (A) and (B). The temperature of the system was raised to 76° C. (the boiling point of the system). At this temperature benzene and water began to distill off from the mixture causing the mixture to be purged of oxygen. The emulsion immediately broke into a separate water layer and organic layer. Thereupon, the acrylamide polymerized in the distinct aqueous medium which was surrounded by the benzene which acted as a heat transfer agent. The rate of agitation of the mixture was increased in order to shear the polymer into particles. The Barrett trap served to remove the water, and the benzene was returned to the reaction mixture. After about 80% of the water (44 ml.) had been removed, the process was stopped and the resultant granules were separated from the solvent by filtration. Thereafter the granules were washed with fresh benzene and air dried.

In a preferred embodiment of the invention, the polymerization reaction is carried out using a redox type catalytic system. In the method described above, either boiling or removal of oxygen by other means is needed to permit the catalyst to form free radicals. In a redox system, the catalyst is activated by means of a reducing agent, which in the absence of oxygen immediately produces free-radicals without the use of heat. One of the reducing agents most commonly used is sodium meta-bisulfite. Other suitable agents include water-soluble thiosulfates, bisulfites, hydrosulfites, and reducing salts, such as the sulfates, of metals which are capable of existing in more than one valence state. These metals include cobalt, iron, nickel, and copper.

The use of a redox initiator system has several advantages, the most important of which is that it is possible to carry out the polymerization at lower temperatures. Heat is not required to decompose the catalyst.

EXAMPLE 2

This example illustrates a method of preparing the subject polymers in which a redox system is used to activate the polymerization catalyst.

Solution (A) was prepared as described in Example 1. A mixture (B) was prepared consisting of 67.5 g. of acrylamide, 6 g. of urea, and 54 g. of distilled water. The solids were dissolved by heating the mixture to about 27° C. To the resultant solution was added, with stirring, 12 ml. of 0.1% potassium persulfate solution and 12 ml. of 0.1% sodium metabisulfite solution. This solution could be held up to 20 minutes at 25° to 27° C. without danger of premature polymerization.

Solution (B) was added to solution (A) with agitation. The temperature was raised to about 73° C., at which point distillation occurred, oxygen was purged from the system, distinct water and organic layers were formed, and the polymerization reaction began. After polymerization was completed 80% of the water (62 ml.) was boiled off by azeotropic distillation. The resultant granules were separated from the solvent by filtration and then were washed with fresh benzene and air dried.

EXAMPLE 3

This example illustrates the use of a redox system to activate the polymerization catalyst, where various amounts of catalyst and activator are employed. Solution (A) consisted of 500 ml. of benzene, and 24 g. of an antisticking agent mixed in a 1,000 ml. flask which was fitted with a Barrett trap and condenser. Solution (B) was prepared by mixing 67.5 g. of acrylamide, 54 g. of distilled water, and various amounts of potassium persulfate and sodium metabisulfite. The azeotropic mixture of solvent (the organic component of the mixture) and water had a boiling temperature of 73° C. At this temperature the vapor consisted of 91% benzene and 9% water.

| Product No. | Amount of Catalyst, g./67.5 g. acrylamide | Amount of Activator, g./67.5 g. acrylamide | Resultant Product |
|---|---|---|---|
| 1 | .012 | .012 | Water-soluble granules. |
| 2 | .006 | .006 | Do. |
| 3 | .003 | .003 | Do. |
| 4 | .0045 | .0045 | Do. |

As was pointed out above, the catalyst concentration can vary from about 0.003 to 0.2%, based on the weight of the acrylamide.

EXAMPLE 4

This example illustrates the preparation of polyacrylamide on a larger scale than in Examples 1 to 3. Solution (A) consisting of 1,750 lbs. of acrylamide, 154 lbs. of urea, and 1,400 lbs. of soft water was prepared in a stainless steel mixing tank. The temperature of the solution was maintained below 100° F. Concurrently with the preparation of solution (A), 1,250 gallons of heat transfer agent (toluene) containing 260 lbs. of an antisticking agent (Arlacel 80) was pumped into a reaction vessel from a storage tank. Fourteen (14) liters of a 1% $K_2S_2O_8$ solution and 14 liters of a 1% $Na_2S_2O_5$ solution were added to solution (A). Immediately thereafter solution (A) was passed into the reaction vessel. The reaction mixture was then heated with mild agitation to 170 to 175° F. by steam coils. Vacuum was applied slowly to the system to induce boiling. At 165° to 170° F. and 450 to 550 mm. Hg abs. pressure, gentle boiling began. The pressure was maintained and the batch temperature dropped rapidly as the organic heat transfer medium vaporized. The boiling of the mixture purged the system of oxygen. At substantially the same time the emulsion, which had formed due to the presence of the antisticking agent, broke into a distinct aqueous layer and a distinct organic layer. Polymerization within the aqueous layer began within 1 to 3 minutes after the boiling point of the system had been reached, as indicated by a sudden rise in temperature. Full cooling was applied and the pressure returned to atmospheric pressure. The temperature increased rapidly to roughly 200° F. The batch began boiling at about 190° F. Vigorous agitation was applied to the system in order to shear the viscosity of 260 cps. at a 1.0% concentration. In contrast, beads which were produced by a comparable suspension polymerization process had a viscosity of only 50 cps. at a 1% concentration.

In the following examples the effectiveness of various products prepared by the subject process as coagulants is compared with the effectiveness of a commercially available polyacrylamide coagulant. The prior art product was prepared by a conventional "dilute solution" method. In substance, the prior art process consists of heating an aqueous solution containing from about 5% to 10% acrylamide in the presence of 0.2–2.0% of a catalyst, such as potassium persulfate. Following the polymerization step the product is dried, usually by means of drum dryers, ovens or spray dryers.

The following chart sets forth nine products which are illustrative of the subject polymers and copolymers.

TABLE I

| | Monomer | Solvent | Catalyst | Catalyst Concentration, Percent* | Urea, Percent* | Redox System | Water Content of Granules, Percent |
|---|---|---|---|---|---|---|---|
| 1 | Acrylamide | Benzene | Potassium persulfate | .06 | 12 | No | 5 |
| 2 | do | do | do | .10 | 0 | Yes | 10 |
| 3 | do | do | do | .19 | 0 | Yes | 25 |
| 4 | do | Toluene | Ammonium persulfate | .03 | 18 | No | 28 |
| 5 | do | do | Hydrogen peroxide | .05 | 3 | No | 0 |
| 6 | do | do | Potassium persulfate | .12 | 0 | No | 15 |
| 7 | do | Xylene | do | .06 | 0 | No | 20 |
| 8 | 60% acrylamide plus 40% acrylic acid | Benzene | Ammonium persulfate | .08 | 6 | Yes | 5 |
| 9 | 75% acrylamide plus 25% dimethyl amino ethyl methacrylate | do | Potassium persulfate | .16 | 10 | Yes | 20 |

*Based on the weight of acrylamide.

polymerizate as it formed. When the reaction was finished the temperature of the system dropped off rapidly.

The batch was reheated to the boiling point with maximum steam in order to remove the water by azeotropic distillation. As boiling progressed the mixed toluene-water vapor was condensed and collected in the receiver. As the toluene and water separated into two phases the upper (toluene) layer was recycled back to the reactor. This process was continued until 80% of the water had been removed. After cooling, the toluene was pumped from the reactor through a strainer device into the storage tank. The pressure in the reactor was reduced to less than 100 mm. Hg abs. for one-half hour to remove excess toluene from the granules of polymer.

EXAMPLE 5

In this example the polymer was prepared by subject concentrated solution polymerization method in the following manner. Solution (A) was made up consisting of 667 ml. of toluene and 16 g. of Arlacel 80 and was added to a glass reaction vessel. Solution (B) consisted of the following materials:

162 g. of 55.5% acrylamide solution
8 g. of urea
0.8 ml. of 1% potassium persulfate
0.8 ml. of 1% sodium metabisulfite Solution (B) was added to solution (A) in a reaction vessel with mild agitation. The mixture was heated to 70° C' and was then purged with 750 cc. per minute of nitrogen for 15 minutes. During this time, a separation occurred wherein the aqueous layer settled to the bottom of the vessel. The monomer polymerized en masse within the aqueous layer. Vigorous agitation was begun after the polymerization to shear the polymer and form granular particles. Water was removed by azeotropic distillation. After the distillation had been completed, the reaction mixture was cooled, filtered, and air dried. The granules that were produced in the process had a In the tests the particular coagulant was added to a uranium ore slurry which contained 30% solids. In the test procedure, 250 ml. of slurry was placed in a graduated cylinder along with particular amounts of the specific coagulants. The cylinder was agitated and was then allowed to stand. After 3, 6, and 9 minutes the volume of the clear supernatant liquid was observed. The amount of clear liquid is evidence of the effectivness of the coagulant.

EXAMPLE 6

In this example, two products prepared as described in Example 1 are compared with a conventional coagulant. The results are as follows:

IMPROVEMENT IN SEDIMENTATION RATE OF URANIUM ORE SLURRY NORTHSPAN NEUTRAL THICKENER TEST

| Product No. | Dosage, lbs. per ton of Ore | Supernatant Volume after Settling (3 minutes) |
|---|---|---|
| Product A | .021 | 86 |
|  | .016 | 78 |
|  | .010 | 79 |
|  | .005 | 44 |
| Product B | .021 | 89 |
|  | .016 | 78 |
|  | .010 | 76 |
|  | .005 | 57 |
| Commercial polyacrylamide coagulant | .021 | 56 |

All of the above tests were made on the same day, using the same ore slurry. As is evident from the results, coagulants A and B are significantly superior to the prior art coagulant.

EXAMPLE 7

In these tests, two polyacrylamide polymers prepared by the redox process described in Example 2 were compared with a commercially available polyacrylamide using a uranium ore slurry containing 30% solids as the test mixture. Product 2 is the same as Product 1 (and the product prepared as described in Example 2) except that the mixture of solution B and solution A was held at 40° C. for 3 hours before the azeotropic distillation was begun.

IMPROVEMENT IN SEDIMENTATION RATE OF URANIUM ORE SLURRY NORTHSPAN NEUTRAL THICKENER TEST

| Product No. | Dosage, lbs. per ton of Ore | Supernatant Volume after Settling | | |
|---|---|---|---|---|
| | | 3 min. | 6 min. | 9 min. |
| 1 | .014 | 46 | 71 | 90 |
| | .028 | 48 | 82 | 105 |
| | .056 | 64 | 106 | 120 |
| 2 | .014 | 46 | 74 | 95 |
| | .028 | 50 | 87 | 105 |
| | .056 | 63 | 106 | 119 |
| Commercial polyacrylamide coagulant. | .028 | 44 | 78 | 98 |
| | .056 | 45 | 83 | 105 |

Once again the products prepared by the persent process proved to be superior as coagulants to the prior art polyacrylamide coagulant. This test also demonstrates the fact that the redox system can be used effectively to produce satisfactory coagulants.

EXAMPLE 8

In this example, a product covered by the subject invention was compared with a prior art polyacrylamide as a coagulant over a wide concentration range. As in Examples 6 and 7, a uranium ore slurry containing 30% solids was used as a test medium. A product prepared in accordance with Example 2 was used for comparative purposes.

IMPROVEMENT IN SEDIMENTATION RATE OF URANIUM ORE SLURRY NORTHSPAN NEUTRAL THICKENER TEST

| Product No. | Dosage, lbs. per ton of Ore | Supernatant Volume after Settling | | |
|---|---|---|---|---|
| | | 3 min. | 6 min. | 9 min. |
| Prepared according to Ex. 2 | .007 | 52 | 87 | 105 |
| | .014 | 64 | 97 | 114 |
| | .014 | 60 | 93 | 111 |
| | .028 | 70 | 105 | 119 |
| | .028 | 67 | 103 | 117 |
| | .042 | 76 | 110 | 123 |
| | .056 | 79 | 111 | 123 |
| | .056 | 77 | 112 | 125 |
| Commercial polyacrylamide coagulant. | .014 | 45 | 75 | 93 |
| | .028 | 42 | 72 | 93 |
| | .028 | 43 | 70 | 91 |
| | .056 | 48 | 74 | 104 |
| | .056 | 42 | 85 | 92 |
| | .070 | 60 | 88 | 108 |

As is apparent from the above results, the amount of prior art polyacrylamide needed to produce a given settling rate is about 8 to 10 times that of the polyacrylamide prepared by the subject process. Conversely, at a given dosage the rate of setting is considerably higher with the product of Example 2 than with the commercially available material.

Other ethylenically unsaturated water-soluble monomers such as methacrylamide, acrylic acid, and methacrylic acid can be polymerized by the subject process in exactly the same manner as is described above with respect to acrylamide.

EXAMPLE 9

This example shows the preparation of polyacrylic acid by the subject method. Solution (A) was prepared as described in Example 1. Solution (B) was prepared consisting of 67.5 g. of acrylic acid, 6 g. of urea, and 54 g. of distilled water. The solids were dissolved by heating the mixture to about 27° C. To the resultant solution was added, with stirring, 12 ml. of 0.1% potassium persulfate solution and 12 ml. of 0.1% sodium metabisulfite solution. This solution could be held up to 20 minutes at 25° to 27° C. without danger of premature polymerization.

Solution (B) was added to solution (A) with agitation. The temperature was raised to about 73° C., at which point distillation occurred, oxygen was purged from the system, distinct water and organic layers were formed, and the polymerization reaction began. After polymerization was completed 80% of the water (62 ml.) was boiled off by azeotropic distillation. The resultant granules were separated from the solvent by filtration and then were washed with fresh benzene and air dried.

As has been pointed out, a great many surface active agents can be used in the subject process. Those compounds mentioned above are illustrative of suitable and readily available products. The amount of surface active agent used in the process can vary from about .5 to about 7%, and preferably 2% to 4% by weight based on the weight of the heat transfer medium. Too large a quantity of the surface active agent should be avoided inasmuch as an excess might tend to form stable emulsions or suspensions. The surface active agents function primarily to prevent the forming polymer from sticking to either the agitator or walls of the reaction vessel.

The selection of particular catalysts—or activators, should a redox system be employed—for use in the process does not fall within the scope of our invention. Conventional catalysts such as potassium persulfate, and conventional activators, such as sodium metabisulfite, work very satisfactorily. It is important, however, that the amount a catalyst used in the process vary from 0.003% to about .2%, based on the weight of the monomer or on the weight of the monomer and copolymerizable material.

It is preferred to dissolve the catalyst and the activator in separate water solutions prior to adding to the acrylamide solutions. The catalyst and activator can be dissolved in the aqueous acrylamide solution prior to adding the solution to the organic agent. Alternatively, the catalyst can be dissolved in a small amount of water and then be added to the solvent prior to the addition of the acrylamide solution. Another satisfactory method would be to dissolve the catalyst and/or activator in water and add this solution to the reaction mixture after the acrylamide solution has been added to the solvent.

The water content of the granules that are produced by the method should range from 0 to about 28%. Our preferred water content range is from about 5% to about 15%. If the moisture content of the polymer is greater than about 28% the granules tend to agglomerate.

Several organic heat transfer liquids have been suggested above which can be used in the subject process. It is preferred that these liquids form azeotropic mixtures with water. By azeotropic mixtures we mean mixtures which on heating will cause water to distill over at temperatures below the normal boiling point of the water at a given pressure. The use of an azeotropic mixture makes it possible to remove water from the polymer particles without employing special drying equipment. Apart from the fact that these liquids must not contain reactive groups such as alcohol, aldehyde, and ketone groups, which would cause side reactions, the selection of the particular heat transfer medium is not particularly critical. Benzene is a relatively inexpensive component and it has been found to provide excellent results. For this reason, it is our preferred organic material.

As was pointed out above, the heat transfer medium plays an important part in the subject concentrated solution polymerization method. In particular, the function of the organic liquid is to remove the heat of reaction from the forming polymer.

One of the important steps of the subject process involves the removal of dissolved oxygen gas from the reaction mixture. The removal of the oxygen can be accomplished by (1) purging the reaction mixture with an inert gas such as nitrogen or carbon dioxide, (2) boiling the reaction mixture, and (3) applying a partial vacuum to the system. If an inert gas is used to remove the oxygen, it is best applied by passing the gas through a disperser or sparger which is inserted beneath the surface of the mixture.

One of the major disadvantages of the prior art methods is that only dilute solutions of acrylamide could be polymerized without causing a violent reaction or without producing a rubbery, nonflowable material. In the subject process, the monomer content of the aqueous solution can range from about 30% to about 80% by weight. Primarily because it is possible to work with concentrated solutions of monomer, the formed polymers have unusual and highly advantageous properties. As is shown in the examples, the acrylamide polymers are far more effective as coagulants than polyacrylamides which are at present commercially used for this purpose. The subject process also produces polymers which are more effective as coagulants than the polyacrylamides which are formed by suspension of emulsion polymerization methods.

Obviously many modifications and variations of the invention as hereinbefore set forth may be made without departing from the spirit and scope thereof, and therefore only such limitations should be imposed as are indicated in the appended claims.

We claim:

1. A process which comprises agitating a mixture of (1) an aqueous solution containing from about 30% to about 80% by weight of an ethylenically unsaturated, water-soluble monomer selected from the group consisting of acrylamide, methacrylamide, acrylic acid, methacrylic acid, and mixtures thereof and co-monomers of one of said monomers and another ethylenically unsaturated, water-soluble monomer, (2) a water-insoluble inert organic heat transfer medium, (3) from about 0.003% to about 0.2% by weight of a free radical polymerization catalyst, based on the weight of said monomer, and (4) a surface active antisticking agent, the amount of said agent only being sufficient to prevent sticking; raising the temperature of said mixture to a predetermined point; removing the dissolved oxygen from said mixture whereby a distinct aqueous layer is formed within said mixture which is surrounded by said heat transfer medium; and polymerizing said monomer within said aqueous layer surrounded by said heat transfer medium while maintaining satisfactory agitation.

2. A process which comprises agitating a mixture of (1) an aqueous solution containing from about 30% to about 80% by weight of an ethylenically unsaturated water-soluble monomer selected from the group consisting of acrylamide, methacrylamide, acrylic acid, methacrylic acids, and mixtures thereof and co-monomers of one of said monomers and another ethylenically unsaturated, water-soluble monomer, (2) a water insoluble inert organic heat transfer medium which is capable of forming an azeotropic mixture with water, (3) from about 0.003% to about 0.2% by weight of a free radical polymerization catalyst, based on the weight of said monomer, and (4) a surface active antisticking agent, the amount of said agent only being sufficient to prevent sticking; raising the temperature of said mixture to a predetermined point; removing the dissolved oxygen from said mixture whereby a distinct aqueous layer is formed within said mixture which is surrounded by said heat transfer medium, and whereby said monomer is polymerized within said aqueous layer, vigorously agitating said mixture to shear said polymer into particles, and thereafter maintaining the temperature of said mixture at the boiling point of said mixture for a sufficient period of time to lower the water content of the resultant polymer to from 0% to about 28% by weight.

3. A process as in claim 1 wherein said monomer is acrylamide.

4. A process as in claim 2 wherein said monomer is acrylamide.

5. A process which comprises agitating a mixture of (1) an aqueous solution containing from about 30% to about 80% by weight of an ethylenically unsaturated, water-soluble monomer selected from the group consisting of acrylamide, methacrylamide, acrylic acid, methacrylic acid, and mixtures thereof and co-monomers of one of said monomers and another ethylenically unsaturated, water-soluble monomer, (2) a water-insoluble inert organic heat transfer medium which is capable of forming an azeotropic mixture with water, (3) from about 0.003% to about 0.2% by weight of a free radical polymerization catalyst, based on the weight of said monomer, and (4) a surface active antisticking agent, the amount of said agent only being sufficient to prevent sticking; raising the temperature of said mixture to its boiling point whereby the dissolved oxygen is removed from said mixture and whereby a distinct aqueous layer is formed within said mixture which is surrounded by said heat transfer medium; vigorously agitating said mixture to shear the polymer into particles, and thereafter maintaining the temperature of said mixture at its boiling point for a sufficient period of time to lower the water content of the resulting polymer to form 0% to about 28% by weight.

6. A process as in claim 5 wherein the monomer is acrylamide.

7. A process which comprises agitating a mixture of (1) an aqueous solution containing from about 30% to about 80% by weight of an ethylenically unsaturated, water-soluble monomer selected from the group consisting of acrylamide, methacrylamide, acrylic acid, methacrylic acid, and mixtures thereof and co-monomers of one of said monomers and another ethylenically unsaturated, water-soluble monomer, (2) a water-insoluble inert organic heat transfer medium, (3) from about 0.003% to about 0.2% by weight of a free radical polymerization catalyst and from about 0.003% to about 0.2% of a catalyst activator, based on the weight of said monomer, and (4) a surface active anti-sticking agent, the amount of said agent only being sufficient to prevent sticking; raising the temperature of said mixture to a predetermined point; removing the dissolved oxygen from said mixture whereby a distinct aqueous layer is formed within said mixture which is surrounded by said heat transfer medium; and polymerizing said monomer within said aqueous layer surrounded by said heat transfer medium while maintaining satisfactory agitation.

8. A process which comprises agitating a mixture of (1) an aqueous solution containing from about 30% to about 80% by weight of an ethylenically unsaturated, water-soluble monomer selected from the group consisting of acrylamide, methacrylamide, acrylic acid, methacrylic acid, and mixtures thereof and co-monomers of one of said monomers and another ethyenically unsaturated, water-soluble monomer, (2) a water-insoluble inert organic heat transfer medium which is capable of froming an azeotropic mixture with water, (3) from about 0.003% to about 0.2% by weight of a free radical polymerization catalyst and from about 0.003% to about 0.2% of a catalyst activator, based on the weight of said monomer, and (4) a surface active antisticking agent, the amount of said agent only being sufficient to prevent sticking; raising the temperature of said mixture to a predetermined point; removing the dissolved oxygen from said mixture whereby a distinct aqueous layer is formed within said mixture which is surrounded by said heat transfer medium, and whereby said monomer is polymerized within said aqueous layer, vigorously agitating said mixture to shear said polymer into particles, and thereafter maintaining the temperature of said mixture at the boiling point of said mixture for a sufficient period of time to lower the water content of the resultant polymer to from 0% to about 28% by weight.

9. A process as in claim 7 wherein the monomer is acrylamide.

10. A process as in claim 8 wherein the monomer is acrylamide.

11. A process as in claim 3 wherein the amount, in parts by weight, of the surface active antisticking agent is from about .5 to about 7% based on the weight of the heat transfer medium.

12. A process as in claim 3 wherein the amount of catalyst is from about 0.003% to about 0.05% by weight based on the weight of the acrylamide.

13. A process as in claim 3 wherein the amount of catalyst is from about 0.003% to about 0.05% by weight based on the weight of the acrylamide, and wherein the water content of the resultant polymer is from about 5% to about 15% by weight.

14. A process as in claim 3 wherein the inert organic liquid is selected from the group consisting of benzene, toluene, xylene, ethylene dichloride, carbon tetrachloride, and tetrachloroethylene.

15. A composition of matter prepared as described in claim 1.

16. An improved method of settling a liquid-solid slurry which comprises adding to said slurry a minor amount of the product produced by the process of claim 3.

References Cited by the Examiner

UNITED STATES PATENTS

| | | | |
|---|---|---|---|
| 2,289,540 | 7/1942 | Dittmar et al. | 89.7 X |
| 3,053,819 | 9/1962 | Carlin | 89.7 X |

FOREIGN PATENTS

| | | |
|---|---|---|
| 841,127 | 7/1960 | Great Britain. |

JOSEPH L. SCHOFER, *Primary Examiner.*

HAROLD BURSTEIN, *Examiner.*

J. J. KLOCKO, C. R. REAP, *Assistant Examiners.*